(12) United States Patent
Mamchuk et al.

(10) Patent No.: US 12,122,425 B2
(45) Date of Patent: Oct. 22, 2024

(54) VEHICLE SYSTEMS AND RELATED METHODS OF DYNAMIC PATH CONSTRUCTION

(71) Applicant: GM GLOBAL TECHNOLOGY OPERATIONS LLC, Detroit, MI (US)

(72) Inventors: Tetyana V Mamchuk, Walled Lake, MI (US); Paul A Adam, Milford, MI (US); Christopher Michael Churay, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 17/659,916

(22) Filed: Apr. 20, 2022

(65) Prior Publication Data
US 2023/0339506 A1  Oct. 26, 2023

(51) Int. Cl.
*B60W 60/00* (2020.01)
*B60W 50/00* (2006.01)

(52) U.S. Cl.
CPC .... *B60W 60/0015* (2020.02); *B60W 50/0098* (2013.01); *B60W 2050/0026* (2013.01); *B60W 2520/10* (2013.01)

(58) Field of Classification Search
CPC ............. B60W 2556/45; B60W 60/0015
See application file for complete search history.

(56) References Cited

U.S. PATENT DOCUMENTS

| | | | |
|---|---|---|---|
| 10,732,625 B2 | 8/2020 | Weinstein-Raun | |
| 11,724,673 B2 * | 8/2023 | Yang | B60T 8/58 701/70 |
| 2020/0218268 A1 * | 7/2020 | Sato | G05D 1/0214 |
| 2020/0398894 A1 * | 12/2020 | Hudecek | G05D 1/0214 |
| 2021/0031760 A1 * | 2/2021 | Ostafew | G05D 1/0088 |
| 2021/0114617 A1 * | 4/2021 | Phillips | B60W 30/0956 |
| 2023/0311860 A1 * | 10/2023 | Gonzalez Bautista | B60W 30/09 701/301 |

* cited by examiner

*Primary Examiner* — Jaime Figueroa
*Assistant Examiner* — Jerrod Irvin Davis
(74) *Attorney, Agent, or Firm* — Lorenz & Kopf LLP

(57) ABSTRACT

Vehicles and related systems and methods are provided for controlling a vehicle in an autonomous operating mode. One method involves identifying one or more avoidance zones in a vicinity of the vehicle, determining a deadline for completing a lateral maneuver to avoid a priority avoidance zone of the one or more avoidance zones, obtaining an initial reference lateral trajectory for the lateral maneuver based at least in part on the deadline, autonomously operating one or more actuators onboard the vehicle in accordance with the initial reference lateral trajectory, and thereafter obtaining one or more updated reference lateral trajectories for the vehicle, wherein the one or more actuators onboard the vehicle are autonomously operated in accordance with the one or more updated reference lateral trajectories in lieu of the initial reference lateral trajectory.

20 Claims, 5 Drawing Sheets

VEHICLE SYSTEMS AND RELATED METHODS OF DYNAMIC PATH CONSTRUCTION

INTRODUCTION

The technical field generally relates to vehicle systems and more particularly relates to dynamic lateral path construction for autonomous operation of a vehicle to satisfy a lateral maneuver deadline.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Due to the sheer number of different variables in a real-world environment, an autonomous vehicle control system could encounter an environment or scenario where assistance may be desired during the decision-making process. For example, road construction, road closures, and other obstacles or scenarios can be encountered that inhibit the ability of the control system to arrive at a solution for how to autonomously operate the vehicle in the context of lane boundaries or other restrictions or constraints for which compliance is sought. In lower-level automation systems (e.g., Level Three or below), such scenarios may require a driver or other vehicle occupant could manually control or operate the vehicle in some instances, which introduces a burden on a rider that is somewhat contrary to the intent of the automation. Accordingly, it is desirable to provide vehicle control systems and methods that are capable of autonomously resolving a scenario where concerns about latencies or delays inhibit arriving at a satisfactory solution for how to autonomously operate the vehicle. Other desirable features and characteristics of the present invention will become apparent from the subsequent detailed description and the appended claims, taken in conjunction with the accompanying drawings and the foregoing technical field and background.

SUMMARY

Apparatus for a vehicle and related methods for controlling the vehicle in an autonomous operating mode are provided. In one aspect, a method of controlling a vehicle in an autonomous operating mode involves identifying, by a controller associated with the vehicle, one or more avoidance zones in a vicinity of the vehicle, determining, by the controller, a deadline for completing a lateral maneuver to avoid a priority avoidance zone of the one or more avoidance zones, obtaining, by the controller, an initial reference lateral trajectory for the lateral maneuver based at least in part on the deadline, autonomously operating, by the controller, one or more actuators onboard the vehicle in accordance with the initial reference lateral trajectory, and thereafter obtaining, by the controller, one or more updated reference lateral trajectories for the vehicle, wherein the controller autonomously operates the one or more actuators onboard the vehicle in accordance with the one or more updated reference lateral trajectories in lieu of the initial reference lateral trajectory.

In one aspect, obtaining the initial reference lateral trajectory involves obtaining initial reference lateral trajectory information from a lookup table maintained in a data storage associated with the vehicle using the deadline for completing the lateral maneuver. In a further aspect, the method involves determining, by the controller, an updated deadline for completing the lateral maneuver after autonomously operating the one or more actuators onboard the vehicle in accordance with the initial reference lateral trajectory, wherein obtaining the one or more updated reference lateral trajectories comprises obtaining updated reference lateral trajectory information from the lookup table using the updated deadline and the controller autonomously operates the one or more actuators onboard the vehicle in accordance with an updated reference lateral trajectory corresponding to the updated reference lateral trajectory information in lieu of the initial reference lateral trajectory. In another aspect, the method involves identifying, by the controller, a deviation between a current pose of the vehicle and the initial reference lateral trajectory that is greater than a trajectory updating threshold, wherein obtaining the one or more updated reference lateral trajectories comprises obtaining updated reference lateral trajectory information from the lookup table when the deviation is greater than the trajectory updating threshold and the controller autonomously operates the one or more actuators onboard the vehicle in accordance with an updated reference lateral trajectory corresponding to the updated reference lateral trajectory information in lieu of the initial reference lateral trajectory.

In another aspect, the method involves determining, by the controller, an updated deadline for completing the lateral maneuver after autonomously operating the one or more actuators onboard the vehicle in accordance with the initial reference lateral trajectory, wherein obtaining the one or more updated reference lateral trajectories comprises obtaining an updated reference lateral trajectory using the updated deadline and the controller autonomously operates the one or more actuators onboard the vehicle in accordance with the updated reference lateral trajectory in lieu of the initial reference lateral trajectory. In another aspect, autonomously operating the one or more actuators onboard the vehicle in accordance with the initial reference lateral trajectory comprises a guidance system inputting the initial reference lateral trajectory as input route information to a vehicle control system configured to generate control signals for the one or more actuators onboard the vehicle according to the input route information. In yet another aspect, the method involves identifying, by the controller, the priority avoidance zone of the one or more avoidance zones as a respective avoidance zone of the one or more avoidance zones that the vehicle is expected to reach earliest in time relative to other avoidance zones of the one or more avoidance zones. In yet another aspect, determining the deadline for completing the lateral maneuver comprises calculating an estimated amount of travel time between a current pose of the vehicle and the priority avoidance zone based on a distance between the vehicle and the priority avoidance zone and a velocity of the vehicle relative to a second velocity associated with the priority avoidance zone.

An apparatus for a vehicle is provided that includes a data storage to maintain a lookup table of lateral planning information, one or more sensing devices onboard the vehicle, one or more actuators onboard the vehicle, and a controller that, by a processor, identifies one or more avoidance zones in a vicinity of the vehicle based at least in part on sensor data from the one or more sensing devices onboard the vehicle, determines a deadline for completing a lateral maneuver to avoid a priority avoidance zone of the one or more avoidance zones, obtains first lateral planning information for the lateral maneuver from the lookup table based at least in part on the deadline, and autonomously operates one or more actuators onboard the vehicle in accordance with a reference lateral trajectory corresponding to the first lateral planning information. In one aspect, the controller obtains, from the lookup table, updated lateral planning information for the vehicle after autonomously operating one or more actuators onboard the vehicle in accordance with the reference lateral trajectory and thereafter autonomously operates the one or more actuators onboard the vehicle in accordance with an updated reference lateral trajectory corresponding to the updated lateral planning information in lieu of the reference lateral trajectory. In another aspect, the controller determines an updated deadline for completing the lateral maneuver after autonomously operating the one or more actuators onboard the vehicle in accordance with the reference lateral trajectory, obtains an updated lateral planning information from the lookup table using the updated deadline, and thereafter autonomously operates the one or more actuators onboard the vehicle in accordance with an updated reference lateral trajectory corresponding to the updated lateral planning information in lieu of the reference lateral trajectory.

In another aspect, the controller identifies a deviation between a current pose of the vehicle and the reference lateral trajectory that is greater than a trajectory updating threshold, obtains updated lateral planning information from the lookup table when the deviation is greater than the trajectory updating threshold, and thereafter autonomously operates the one or more actuators onboard the vehicle in accordance with a updated reference lateral trajectory corresponding to the updated lateral planning information in lieu of the reference lateral trajectory. In another aspect, the controller comprises a guidance system that inputs the first lateral planning information as input route information to a vehicle control system configured to generate control signals for the one or more actuators onboard the vehicle to achieve the reference lateral trajectory according to the input route information. In yet another aspect, the controller identifies the priority avoidance zone of the one or more avoidance zones as a respective avoidance zone of the one or more avoidance zones that the vehicle is expected to reach earliest in time relative to other avoidance zones of the one or more avoidance zones. In yet another aspect, the controller determines the deadline for completing the lateral maneuver by calculating an estimated amount of travel time between a current pose of the vehicle and the priority avoidance zone based on a distance between the vehicle and the priority avoidance zone and a velocity of the vehicle relative to a second velocity associated with the priority avoidance zone.

An apparatus for a non-transitory computer-readable medium is also provided. The computer-readable medium has stored thereon executable instructions that, when executed by a processor, are configurable cause the processor to identify one or more avoidance zones in a vicinity of a vehicle, determine a deadline for completing a lateral maneuver to avoid a priority avoidance zone of the one or more avoidance zones, obtain an initial reference lateral trajectory for the lateral maneuver based at least in part on the deadline, autonomously operate one or more actuators onboard the vehicle in accordance with the initial reference lateral trajectory, and thereafter obtain one or more updated reference lateral trajectories for the vehicle and autonomously operate the one or more actuators onboard the vehicle in accordance with the one or more updated reference lateral trajectories in lieu of the initial reference lateral trajectory. In one aspect, the executable instructions cause the processor to obtain the initial reference lateral trajectory from a lookup table maintained in a data storage associated with the vehicle using the deadline for completing the lateral maneuver. In another aspect, the executable instructions cause the processor to determine an updated deadline for completing the lateral maneuver after autonomously operating the one or more actuators onboard the vehicle in accordance with the initial reference lateral trajectory, wherein obtaining the one or more updated reference lateral trajectories comprises obtaining an updated reference lateral trajectory using the updated deadline and the processor autonomously operates the one or more actuators onboard the vehicle in accordance with the updated reference lateral trajectory in lieu of the initial reference lateral trajectory. In another aspect, the executable instructions cause the processor to identify the priority avoidance zone of the one or more avoidance zones as a respective avoidance zone of the one or more avoidance zones that the vehicle is expected to reach earliest in time relative to other avoidance zones of the one or more avoidance zones. In yet another aspect, the executable instructions cause the processor to determine the deadline for completing the lateral maneuver by calculating an estimated amount of travel time between a current pose of the vehicle and the priority avoidance zone based on a distance between the vehicle and the priority avoidance zone and a velocity of the vehicle relative to a second velocity associated with the priority avoidance zone.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
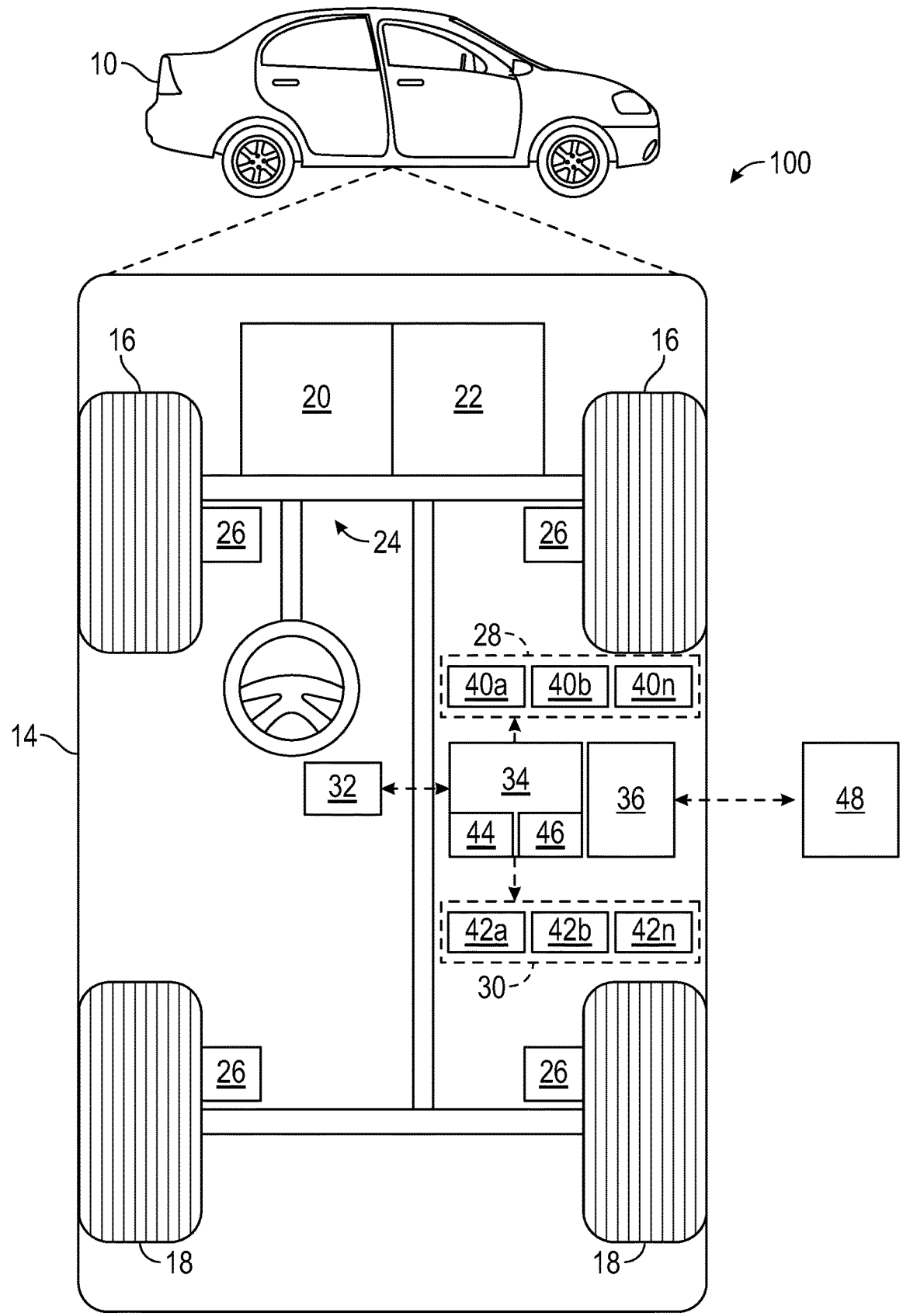
FIG. 1 is a block diagram illustrating an autonomous vehicle control system for a vehicle in accordance with various embodiments.

Referring now to FIG. 1, in accordance with one or more embodiments, an autonomous vehicle control system shown 100 determines a plan for autonomously operating a vehicle 10 along a route in a manner that accounts for objects or obstacles detected by onboard sensors 28, 40, as described in greater detail below. In this regard, a control module onboard the vehicle 10 calibrates different types of onboard sensors 28, 40 with respect to one another and/or the vehicle 10, thereby allowing data from those different types of onboard sensors 28, 40 to be spatially associated or otherwise with one another based on the calibration for purposes of object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary embodiments, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary embodiments, the data storage element 46 maintains a lookup table of lateral planning information that may be utilized to determine corresponding lateral reference trajectories for maneuvering laterally into an adjacent lane, with the lateral planning information and resulting reference lateral trajectory being utilized or otherwise referenced by the processor 44 to determine commands for autonomously operating the vehicle 10 when the normal vehicle guidance or control scheme supported by the processor 44 encounters a deadline or other temporal constraint for a time-sensitive lateral maneuver to avoid having to solve for a commanded vehicle path within a limited period of time.

Still referring to FIG. 1, in exemplary embodiments, the communication system 36 is configured to wirelessly communicate information to and from other entities 48 over a communication network, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented through the use of a standard wired network, a fiber or other optical network, a cable network, power lines, other wireless networks such as wireless local area networks (WLANs), or networks providing broadband wireless access (BWA), or any combination thereof.

Figure 2:
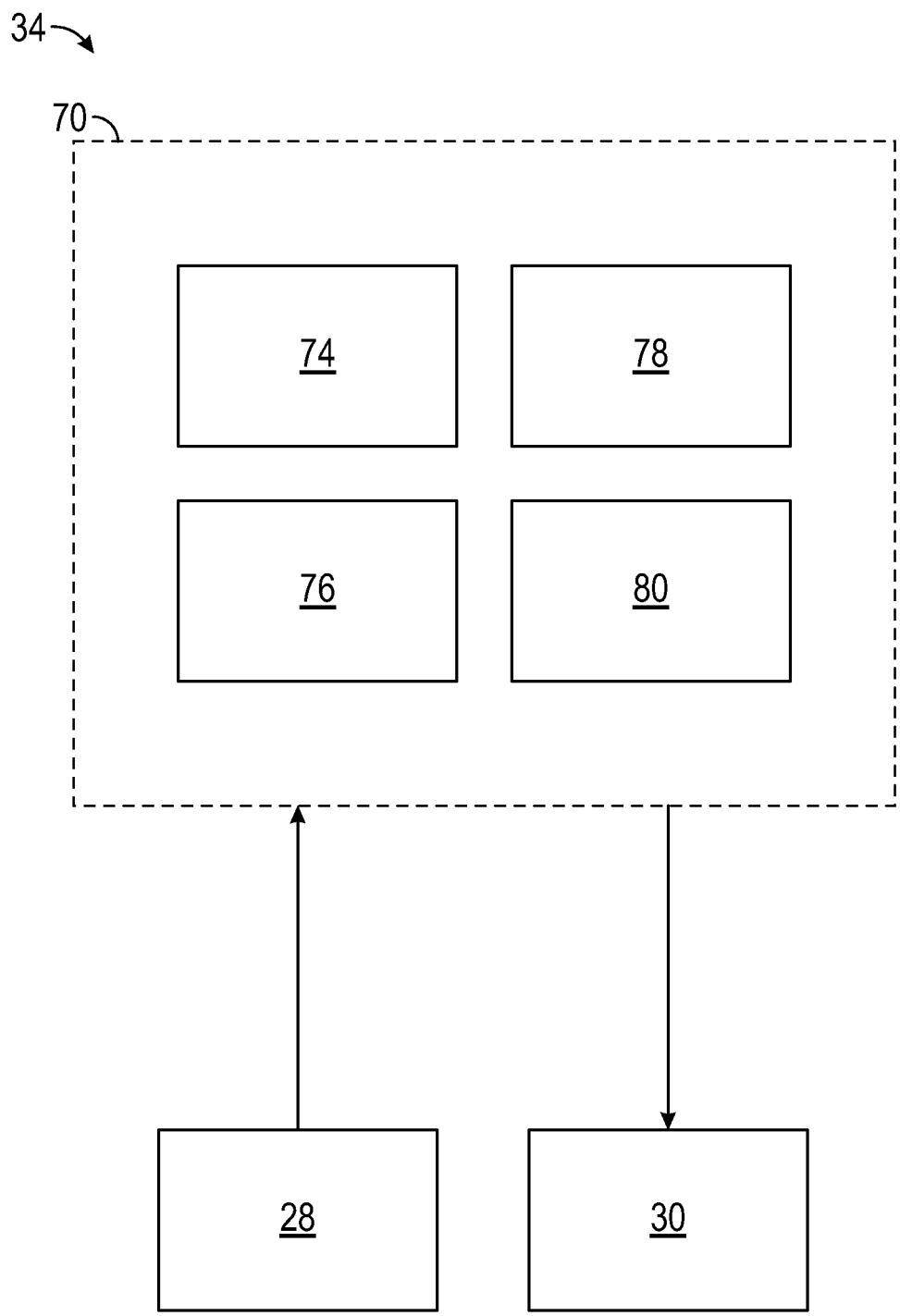
FIG. 2 is a block diagram of an automated driving system (ADS) suitable for implementation by the autonomous vehicle control system of the vehicle of FIG. 1 in accordance with various embodiments.

Referring now to FIG. 2, in accordance with various embodiments, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various embodiments, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. In one or more exemplary embodiments described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various embodiments, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more embodiments, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some embodiments, the longitudinal vehicle constraint data 416 may be calculated or otherwise determined dynamically or substantially in real-time based on the current mass of the vehicle, the current amount of fuel onboard the vehicle, historical or recent performance of the vehicle, and/or potentially other factors. In one or more embodiments, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receives or otherwise obtains user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

As described in greater detail below, in exemplary implementations, the guidance system 78 supports a hands-free autonomous operating mode that controls steering, acceleration and braking while it is enabled and operating to provide lane centering while maintaining a driver-selected speed and/or following distance (or gap time) relative to other vehicles using the current sensor data (or obstacle data) provided by the sensor fusion system 74 and the current vehicle pose provided by the positioning system 76. In the autonomous operating mode, when the guidance system 78 detects, identifies or otherwise determines a deadline exists for making a lateral maneuver to avoid an unexpected obstacle or other object detected in the vicinity of the vehicle 10, the guidance system 78 initiates or otherwise implements a deadline-based lateral maneuvering process to override the preexisting route information and provide a reference lateral trajectory to the lateral solver that is configured to result in the lateral solver varying the steering angle or vehicle wheel angle in a manner that attempts to achieve the reference lateral trajectory, and thereby ensure the vehicle completes the lateral maneuver before the deadline without accounting for any lateral ride preference information, cost optimizations or other iterative optimizations. In other words, the commanded lateral trajectory may violate one or more lateral ride preference settings to ensure the lateral maneuver is completed by the deadline. In such scenarios, the longitudinal solver module calculates or otherwise determines a longitudinal plan for traveling along the commanded lateral trajectory (e.g., by varying the speed or velocity of the vehicle from the current pose in a manner that ensures the vehicle complies with longitudinal ride preference information to the extent possible while also avoiding collisions with objects or obstacles). In this regard, the resulting longitudinal plan generated by the longitudinal solver module may also violate longitudinal ride preference settings in order to adhere to the commanded lateral plan while also adhering to other constraints (e.g., the desired speed and/or following distances associated with the driver's configuration of the autonomous operating mode).

After initiating the deadline-based lateral maneuvering process, the guidance system 78 dynamically updates and adjusts the commanded reference lateral trajectory and corresponding lateral plan based on the most recent vehicle pose and/or progress with respect to the deadline-based lateral maneuver being executed as needed arrive at an updated lateral trajectory that is configured to ensure the lateral maneuver is completed by the deadline based on the most recent vehicle pose. In this regard, in scenarios where the initially implemented lateral plan is not aggressive enough (e.g., the amount of progress with respect to the deadline-based lateral maneuver is less than expected) based on the most recent vehicle pose resulting implementation or execution by the vehicle control system 80, the guidance system 78 may identify an updated reference lateral trajectory that is more aggressive to better ensure the lateral maneuver is completed by the deadline. On the other hand, in scenarios where the initially lateral plan is too aggressive (e.g., the amount of progress with respect to the deadline-based lateral maneuver is more than expected), the guidance system 78 may identify an updated reference lateral trajectory that is less aggressive to improve passenger comfort or rideability while still ensuring the lateral maneuver is completed by the deadline. Additionally, or alternatively, the guidance system 78 also dynamically updates and adjusts the reference lateral trajectory in response to changes to the deadline for completion of the lateral maneuver (e.g., based on the most recent vehicle pose, changes to the detected objects or obstacles by the sensor fusion system 74, etc.), thereby ensuring that the lateral maneuver is completed by the deadline while relaxing the lateral maneuver as appropriate to maintain passenger comfort or rideability to the extent possible.

Figure 3:
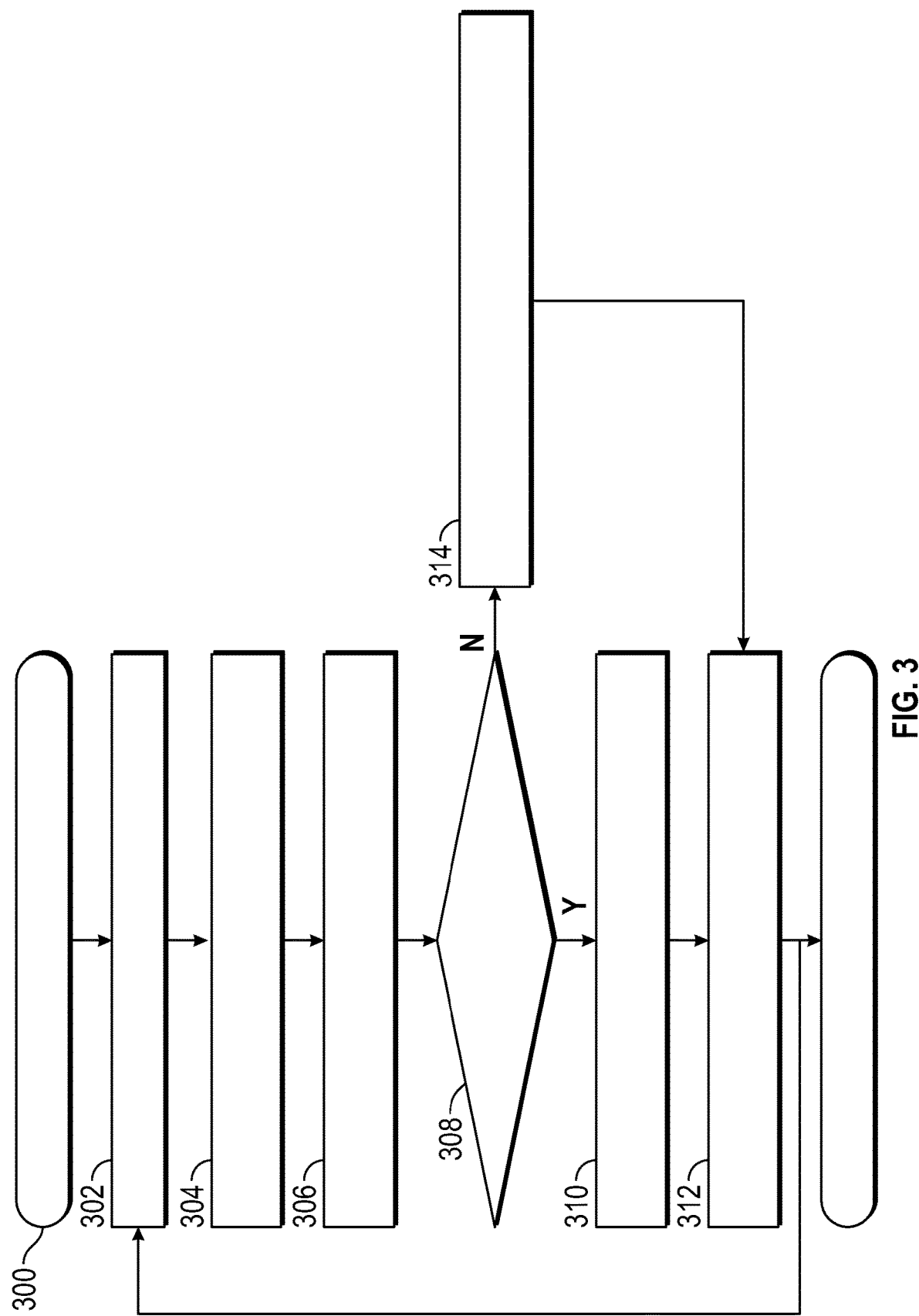
FIG. 3 depicts a flow diagram of a deadline-based lateral maneuvering process suitable for implementation by the ADS of FIG. 2 in the autonomous vehicle control system of FIG. 1 according to one or more aspects described herein.

FIG. 3 depicts an exemplary implementation of a deadline-based lateral maneuvering process 300 suitable for implementation by a control module onboard a vehicle (e.g., by the guidance system 78 of the ADS 70 supported by the controller 34 in the vehicle 10) to ensure performance of a lateral maneuver within a temporal deadline responsive to a detected obstacle, object or other event with respect to an originally planned route of travel. For illustrative purposes, the following description may refer to elements mentioned above in connection with FIGS. 1-2. While portions of the deadline-based lateral maneuvering process 300 may be performed by different elements of a vehicle system, for purposes of explanation, the subject matter may be primarily described herein in the context of the deadline-based lateral maneuvering process 300 being primarily performed by the guidance system 78 of the ADS 70 implemented by the controller 34 associated with the vehicle 10. In one or more exemplary aspects, the deadline-based lateral maneuvering process 300 is performed in connection with the trajectory updating process 400 described in greater detail below in the context of FIG. 4.

In exemplary implementations, the deadline-based lateral maneuvering process 300 is initiated or otherwise performed when the ADS 70 identifies or otherwise detects occurrence of a lateral maneuvering event, for example, in response to the driver manually initiating a lane change (e.g., by manipulating the turn signal switch) or automatically in response to detection of an obstacle or other object in the roadway (e.g., based on the detected object data output by the sensor fusion system 74). In some implementations, the deadline-based lateral maneuvering process 300 may also be automatically initiated in response to noisy sensor data or in response to detecting that the host vehicle is not traveling along the desired lane center, in which case the deadline-based lateral maneuvering process 300 may be initiated to laterally maneuver the host vehicle to converge on a desired centerline for a lane of travel within a threshold period of time.

The deadline-based lateral maneuvering process 300 detects or otherwise identifies one or more avoidance zones in the vicinity of the vehicle at 302 and identifies or otherwise determines the highest priority avoidance zone in the time domain at 304. In this regard, an avoidance zone generally represents the area occupied by an object, obstacle, environmental hazard, roadway hazard or the like that it to be avoided by the ownship vehicle 10, where the deadline-based lateral maneuvering process 300 identifies the highest priority avoidance zone as the avoidance zone that is closest to the vehicle 10 in the time domain, that is, the avoidance zone having the minimum time difference of arrival (or earliest arrival time) for which the vehicle is expected to reach the respective avoidance zone relative to other avoidance zones, such that the vehicle 10 is expected to reach the highest priority avoidance zone (or the object or obstacle associated therewith) soonest, earliest or first in time if the vehicle 10 does not complete execution of the lateral maneuver within that time difference. In other words, the highest priority avoidance zone may not be associated with the object or obstacle closest to the vehicle 10 in terms of distance, but rather, the object or obstacle closest to the vehicle 10 in terms of travel time or the time difference between the current point in time and the deadline point in time when the vehicle 10 is expected to reach the object or obstacle given the current velocity of the vehicle 10.

In an exemplary implementation, the ADS 70 and/or guidance system 78 analyzes the sensor output from the sensor fusion system 74 to identify any objects or obstacles in the vicinity of the vehicle 10 and calculates or otherwise determines an estimated amount of time between the vehicle 10 and the respective object based on the velocity of the vehicle 10 relative to the velocity of the respective object. For example, for another vehicle traveling ahead of the ownship vehicle 10, the ADS 70 and/or guidance system 78 may analyze the output from the sensor fusion system 74 to determine the relative distance between the ownship vehicle 10 and that other vehicle as well as the velocity (or relative velocity) of the other vehicle, which, in turn is utilized to convert the distance between the ownship vehicle 10 and the other vehicle into a corresponding estimated amount of travel time required for the ownship vehicle 10 to reach the other vehicle (e.g., by dividing the distance by the relative velocity). Thus, another vehicle moving in the same direction of the ownship vehicle 10 at substantially the same velocity as the ownship vehicle 10 may be at a relatively large difference or distance from the ownship vehicle 10 in the time domain by virtue of the relative velocity being close to zero. On the other hand, for a stationary object, the ADS 70 and/or guidance system 78 analyzes the output from the sensor fusion system 74 to determine the relative distance between the ownship vehicle 10 and the stationary object and converts that distance into a corresponding estimated amount of travel time required for reaching the stationary object (e.g., by dividing the distance by the velocity of the ownship vehicle 10). Thus, in some scenarios, a stationary object farther from the ownship vehicle 10 may be designated as the highest priority avoidance zone based on the distance in the time domain relative to other vehicles or objects that are closer to the vehicle 10 but are traveling in substantially the same direction as the ownship vehicle 10.

After identifying the highest priority avoidance zone, the deadline-based lateral maneuvering process 300 calculates or otherwise determines a deadline for completing the lateral maneuver based on the highest priority avoidance zone at 306. To determine the deadline point in time for completing the lateral maneuver, the ADS 70 and/or guidance system 78 calculates or otherwise determines an estimated amount of travel time between a current pose of the vehicle 10 at the current point in time and when the vehicle 10 is expected to reach the highest priority avoidance zone at a future point in time based on a distance between the vehicle 10 and the highest priority avoidance zone and a relative velocity of the vehicle 10 with respect to a velocity associated with the highest priority avoidance zone. Additionally, depending on the implementation, the lateral maneuver deadline may be determined by subtracting a buffer amount of time from the estimated amount of travel time required for reaching the highest priority avoidance zone to provide some additional avoidance margin, or alternatively, by subtracting a buffer amount of distance margin from the estimated distance between the vehicle 10 and the object or obstacle associated with the highest priority avoidance zone before converting that adjusted distance into a corresponding amount of travel time in the time domain based on the relative velocity of the vehicle 10. That said, in other implementations, the estimated amount of travel time required for reaching the highest priority avoidance zone may be utilized as the lateral maneuver deadline without any additional buffer, margin or other adjustment.

In the illustrated implementation of the deadline-based lateral maneuvering process 300 depicted in FIG. 3, at 308, the deadline-based lateral maneuvering process 300 determines whether the point in time corresponding to the lateral maneuver deadline has been updated or otherwise changed from a preceding iteration of the deadline-based lateral maneuvering process 300, as described in greater detail below. In this regard, the deadline-based lateral maneuvering process 300 may add the lateral maneuver deadline to the current timestamp to determine the point in time for completing the lateral maneuver, and store or otherwise maintain the resulting point in time as a reference lateral maneuver deadline. Thereafter, during subsequent iterations of the deadline-based lateral maneuvering process 300, the deadline-based lateral maneuvering process 300 may add the updated lateral maneuver deadline determined at 306 to the updated current timestamp to determine whether the resulting point in time matches the reference lateral maneuver deadline from the preceding iteration of the deadline-based lateral maneuvering process 300.

When the deadline-based lateral maneuvering process 300 determines that an updated lateral maneuver deadline exists, during the initial iteration of the deadline-based lateral maneuvering process 300 and/or during one or more subsequent iterations of the deadline-based lateral maneuvering process 300, the deadline-based lateral maneuvering process 300 identifies, obtains or otherwise determines a reference lateral trajectory for satisfying the lateral maneuver deadline and navigating the vehicle around the highest priority avoidance zone at 310. In this regard, in exemplary embodiments, the ADS 70 and/or the guidance system 78 utilizes a lookup table (e.g., maintained in the data storage element 46) to obtain information that defines a sequence of vehicle poses and headings that achieves a reference lateral trajectory that ensures the vehicle completes the lateral maneuver before the deadline as a function of the lateral maneuver deadline (or the amount of time remaining before the lateral maneuver is to be completed), the current velocity of the vehicle 10, the current heading of the vehicle 10 in relation to the current lane of travel and/or the destination lane of travel, and potentially other input variables.

In one or more implementations, the lookup table is configurable to receive, as input, an amount of time required to complete the lateral maneuver (e.g., the amount of time remaining before reaching the lateral maneuver deadline), the current velocity of the vehicle 10, and one or more metrics indicative of the amount of progress with respect to the lateral maneuver being performed (e.g., the rate of change described in greater detail below at 408). The output from the lookup table is realized as a reference lateral trajectory that includes an allowed amount of change laterally (e.g., lateral position, vehicle heading, and path curvature) at one or more look-ahead control points in advance of the current vehicle position, which, in turn, is then utilized by the vehicle control system 80 (and the lateral and longitudinal solver modules respectively) to construct a motion plan in accordance with the reference lateral trajectory and corresponding lateral planning information output by the lookup table. In this regard, the lookup table output anticipates or expects a particular amount of progress of the lateral maneuver over time. As described in greater detail below, when the subsequent lateral position of the vehicle fails to achieve the expected amount of progress laterally, the lookup table is utilized to dynamically obtain an updated reference lateral trajectory and corresponding lateral path planning information (e.g., lateral position, vehicle heading, and path curvature) to maneuver the vehicle more aggressively in order to meet the deadline. On the other hand, when the subsequent lateral position of the vehicle exceeds the expected amount of progress laterally, the lookup table can also be utilized to dynamically obtain updated lateral path planning information that relaxes the lateral maneuvering to improve passenger comfort when the amount of lateral progress indicates that the vehicle is sufficiently likely to meet the deadline.

Still referring to FIG. 3, after identifying a reference lateral trajectory for achieving the lateral maneuver by the lateral maneuver deadline dictated by the highest priority avoidance zone, the deadline-based lateral maneuvering process 300 inputs, transmits or otherwise provides the reference lateral trajectory to the vehicle control system for implementation and execution at 312. In this regard, the guidance system 78 provides the reference lateral trajectory that ensures the vehicle completes the lateral maneuver before the deadline to the vehicle control system 80 as the commanded lateral route to be utilized by the lateral solver to arrive at a sequence of steering angles, steering angle rate of change values, steering angle acceleration values and/or the like for effectuating the reference lateral trajectory. As described above, the longitudinal solver of the vehicle control system 80 may utilize the resulting lateral plan output by the lateral solver to calculate or otherwise determine a corresponding longitudinal plan for traveling along the reference lateral trajectory to the extent possible while also avoiding collisions with objects or obstacles. In this manner, the vehicle control system 80 autonomously controls the actuators 30 onboard the vehicle 10 in accordance with the reference lateral trajectory provided by the guidance system 78 to attempt to complete the lateral maneuver before the deadline.

In exemplary implementations, the deadline-based lateral maneuvering process 300 repeats until the lateral maneuver is completed or there is no longer any lateral maneuver deadline (e.g., due to changing conditions). In this regard, as the vehicle 10 is autonomously operated along the reference lateral trajectory, the deadline-based lateral maneuvering process 300 may dynamically identify or otherwise determine updated avoidance zones at 302, identify an updated highest priority avoidance zone and corresponding updated deadline for completing the lateral maneuver at 304 and 306, and then determine whether the updated lateral maneuver deadline dictated by the highest priority avoidance zone has changed relative to the preceding iteration of the deadline-based lateral maneuvering process 300 at 308. In this regard, as other vehicles or objects in the vicinity of the vehicle 10 move in relation to the vehicle 10 as the vehicle 10 is attempting to traverse the reference lateral trajectory, the deadline for completing the lateral maneuver may move forwards or backwards in time. Accordingly, when the deadline for completing the lateral maneuver changes, the deadline-based lateral maneuvering process 300 obtains an updated reference lateral trajectory at 308 that is either more aggressive in order to satisfy an updated lateral maneuver deadline that has moved forward in time relative to the preceding deadline, or alternatively, is more relaxed in order to satisfy a more delayed updated lateral maneuver deadline that has moved backwards in time relative to the preceding deadline. In this manner, the deadline-based lateral maneuvering process 300 dynamically adjusts the reference lateral trajectory during execution of the lateral maneuver to ensure the lateral maneuver is completed by the deadline. That said, in scenarios where the deadline-based lateral maneuvering process 300 is unable to obtain a reference lateral trajectory at 308 that is capable of satisfying the lateral maneuver deadline, the deadline-based lateral maneuvering process 300 may automatically exit and generate one or more alerts or user notifications that prompts a driver to resume manual control of the vehicle 10, or the ADS 70 may otherwise initiate one or more remedial actions.

Still referring to FIG. 3, when the lateral maneuver deadline is maintained unchanged from one iteration of the deadline-based lateral maneuvering process 300 to the next, the deadline-based lateral maneuvering process 300 dynamically adjusts or otherwise updates the reference lateral trajectory based on the amount or rate of progress of the execution of the lateral maneuver at 314, as described in greater detail below in the context of FIG. 4. In this regard, the ADS 70 and/or the guidance system 78 effectively monitors the behavior of the vehicle control system 80 with respect to implementing a previously provided reference lateral trajectory to verify or otherwise confirm that the vehicle control system 80 is maintaining control of the vehicle 10 along that trajectory, and dynamically adjusts or otherwise updates the reference lateral trajectory to be more or less aggressive when the current amount of progress with respect to the previously provided reference lateral trajectory deviates by more than a threshold. In this manner, even when the lateral maneuver deadline is maintained unchanged, the ADS 70 and/or the guidance system 78 may iteratively adjust the reference lateral trajectory to be more aggressive when the implementation of the previously provided reference lateral trajectory by the vehicle control system 80 indicates that the vehicle control system 80 may be unable to complete the lateral maneuver within the prescribed deadline, or alternatively, the ADS 70 and/or the guidance system 78 may iteratively adjust the reference lateral trajectory to be more relaxed to improve passenger comfort or rideability when the implementation of the previously provided reference lateral trajectory by the vehicle control system 80 indicates that the vehicle control system 80 is sufficiently likely to complete the lateral maneuver in advance of the lateral maneuver deadline.

Figure 4:
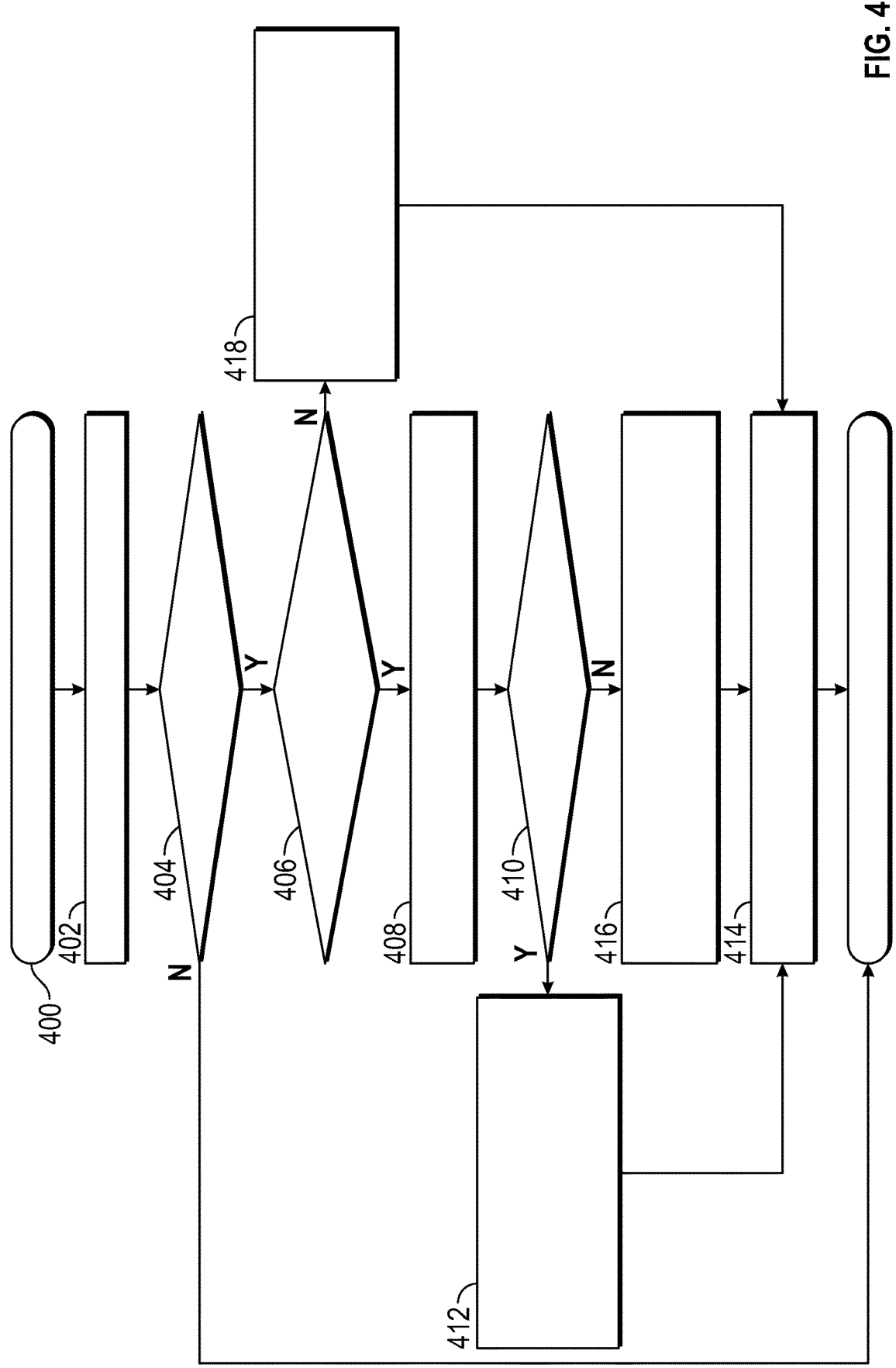
FIG. 4 depicts a flow diagram of a trajectory updating process suitable for implementation by the ADS of FIG. 2 in connection with the deadline-based lateral maneuvering process of FIG. 3 according to one or more aspects described herein.

FIG. 4 depicts an exemplary implementation of a trajectory updating process 400 suitable for use in connection with the deadline-based lateral maneuvering process 300 at 314 to dynamically adjust the reference lateral trajectory to ensure completion of the lateral maneuver by the deadline. For illustrative purposes, the following description may refer to elements mentioned above in connection with FIGS. 1-2. While portions of the trajectory updating process 400 may be performed by different elements of a vehicle system, for purposes of explanation, the subject matter may be primarily described herein in the context of the trajectory updating process 400 being primarily performed by the guidance system 78 of the ADS 70 implemented by the controller 34 associated with the vehicle 10.

The trajectory updating process 400 begins by calculating or otherwise determining the amount by which the current vehicle pose deviates from the current reference trajectory at 402 and determining whether the deviation exceeds a threshold amount of deviation at 404. During each iteration of the deadline-based lateral maneuvering process 300 where the lateral maneuver deadline is maintained unchanged (e.g., at 314 from 308), the ADS 70 and/or the guidance system 78 implementing the trajectory updating process 400 compares the current vehicle pose and/or other vehicle positioning information output by the positioning system 76 to the previously provided reference lateral trajectory (e.g., obtained at 310 and input to the vehicle control system 80 at 312) to calculate or otherwise determine how much the current vehicle pose deviates from the previously provided reference lateral trajectory. When the current vehicle pose has been maintained on the previously provided reference lateral trajectory or is within a threshold amount of deviation from the previously provided reference lateral trajectory, the trajectory updating process 400 determines that the vehicle control system 80 is adequately executing the previously provided reference lateral trajectory to complete the lateral maneuver by the deadline and exits while maintaining the previously provided reference lateral trajectory unchanged (e.g., maintaining the previously provided reference lateral trajectory as input to the vehicle control system 80 at 312).

When the current vehicle pose deviates from the previously provided reference lateral trajectory by more than the trajectory updating threshold amount at 404, the trajectory updating process 400 identifies or otherwise determines whether a lane change maneuver is in progress at 406. In other words, the ADS 70 and/or the guidance system 78 identifies or otherwise determines whether the deadline-based lateral maneuvering process 300 was initiated by a driver or other human user requesting a lane change as opposed to an automated initiation of the deadline-based lateral maneuvering process 300 based on a detected object, obstacle, hazard or other unexpected roadway condition. When a lane change maneuver is in progress, the trajectory updating process 400 calculates or otherwise determines a rate of change associated with the progress of the lane change maneuver at 400. In this regard, the ADS 70 and/or the guidance system 78 determines the percentage of the lane change maneuver that has been completed after the most recent control cycle relative to the percentage of the lane change maneuver that was completed at the start of the most recent control cycle.

At 410, the trajectory updating process 400 determines whether the rate of change associated with the lane change maneuver is greater than a lateral maneuvering threshold that indicates that the lane change maneuver is being performed too aggressively and likely causing the deviation from the previously provided reference lateral trajectory (e.g., at 402 and 404). For example, banking or curvature of the roadway, winds, or other environmental factors may result in the vehicle 10 deviating from the previously provided reference lateral trajectory to be achieved by the vehicle control system 80. When the rate of change associated with the lane change maneuver is greater than the lateral maneuvering threshold that indicates that the lane change maneuver is being performed too abruptly, the trajectory updating process 400 calculates or otherwise determines one or more adjusted inputs for the lookup table based on the rate of change associated with the lane change maneuver progress to relax the reference lateral trajectory for the lateral maneuver and improve passenger comfort or rideability at 412.

After adjusting one or more input variables for the lookup table, the trajectory updating process 400 identifies, obtains or otherwise determines an updated reference lateral trajectory for satisfying the lateral maneuver deadline and navigating the vehicle around the highest priority avoidance zone using the adjusted lookup table input(s) at 414. For example, in a similar manner as described above, the ADS 70 and/or the guidance system 78 utilizes the adjusted input variable(s) along with the lateral maneuver deadline and potentially other input variables to search or otherwise query the lookup table to obtain information that defines a sequence of vehicle poses and headings that achieves an updated reference lateral trajectory that ensures the vehicle completes the lateral maneuver before the deadline with more relaxed lateral maneuvering (e.g., reduced steering angles, reduced rates of change of the steering angle, reduced lateral jerk). The guidance system 78 inputs or otherwise provides updated reference lateral trajectory obtained at 414 to the vehicle control system 80 as the lateral route information for implementation and execution at 312 in a similar manner as described above.

On the other hand, when the rate of change associated with the lane change maneuver is less than the lateral maneuvering threshold and likely causing the deviation from the previously provided reference lateral trajectory in the opposing direction (e.g., by changing lanes too slowly), the trajectory updating process 400 calculates or otherwise determines one or more adjusted inputs for the lookup table based on the rate of change associated with the lane change maneuver progress to increase lateral maneuvering and make the reference lateral trajectory for the lateral maneuver more aggressive at 416. In a similar manner, the trajectory updating process 400 identifies, obtains or otherwise determines a more aggressive updated reference lateral trajectory for satisfying the lateral maneuver deadline and navigating the vehicle around the highest priority avoidance zone using the adjusted lookup table input(s) at 414, that is, a sequence of vehicle poses and headings that achieves an updated reference lateral trajectory that ensures the vehicle completes the lateral maneuver before the deadline with increased lateral maneuvering (e.g., increased steering angles, increased rates of change of the steering angle, increased lateral jerk). The guidance system 78 then inputs or otherwise provides updated reference lateral trajectory obtained at 414 to the vehicle control system 80 as the lateral route information for implementation and execution at 312 in a similar manner as described above.

Still referring to FIG. 4, at 406, when the trajectory updating process 400 determines that a lane change maneuver is not in progress, the trajectory updating process 400 calculates or otherwise determines one or more adjusted inputs for the lookup table based on the change in the lateral maneuver progress over the preceding cycle at 418 before obtaining lateral planning information for a corresponding updated reference trajectory from the lookup table using the adjusted input(s) at 414 in a similar manner as described above. For example, when the lateral maneuver is automatically initiated for something other than a lane change (e.g., in response to noisy sensor data or in response to detecting that the host vehicle is not traveling along the desired lane center, etc.), the change in the lateral maneuver progress may be calculated or otherwise determined to reflect how quickly the current vehicle pose (e.g., lateral position, heading and curvature) is progressing towards aligning with the new or updated centerline for the lane of travel. In this regard, the relationship between current vehicle pose and/or other vehicle positioning information output by the positioning system 76 relative to the preceding iteration is utilized to scale or otherwise adjust one or more input variables for the lookup table based on the relationship. Thus, when the amount of lateral movement relative to the reference trajectory from one iteration to the next is relatively smaller, the ADS 70 and/or the guidance system 78 may calculate or otherwise determine one or more adjusted lookup table input variable(s) to increase the rate or amount of lateral maneuvering. On the other hand, when the amount of lateral movement relative to the reference trajectory from one iteration to the next is relatively larger, the ADS 70 and/or the guidance system 78 may calculate or otherwise determine one or more adjusted lookup table input variable(s) to decrease the rate or amount of lateral maneuvering.

By virtue of the trajectory updating process 400 in concert with the deadline-based lateral maneuvering process 300 of FIG. 3, the lateral reference trajectory may be dynamically and/or iteratively adjusted from one control cycle to the next as needed (e.g., based on changes to the lateral maneuver deadline or deviations from the previously provided trajectory) until converging or otherwise arriving at a lateral reference trajectory that can be implemented or otherwise executed by the vehicle control system 80 without deviating by more than the trajectory updating threshold (e.g., at 404). In this manner, the deadline-based lateral maneuvering process 300 ensures the lateral maneuver is completed by the deadline while relaxing the lateral maneuvering as appropriate to reduce passenger discomfort and maintain rideability.

In exemplary implementations, the lookup table utilized by the deadline-based lateral maneuvering process 300 and the trajectory updating process 400 includes lateral planning information in the form of the amount of allowance (or allowable amount of change) to the lateral vehicle position, vehicle heading, and lateral path curvature are allowed at different look-ahead control points in the future that are utilized by the lateral solver module to derive the corresponding lateral reference trajectory on-the-fly in accordance with the lateral planning information. By iteratively adjusting the lateral planning information based on the amount of lateral maneuvering progress (or deviation from the preceding lateral planning information), the lateral path of the vehicle is dynamically updated or adjusted during the execution of the lateral maneuver to ensure the deadline is met, thereby allowing the automated driving system to maintain autonomous operation of the vehicle without requiring intervention by the driver or another vehicle occupant to complete the lateral maneuver. That said, in other implementations, the lookup table could maintain a plurality of different potential reference trajectories for satisfying the lateral maneuver deadline given the current vehicle pose and lateral maneuver progress, thereby overriding or obviating the lateral solver module.

Figure 6:
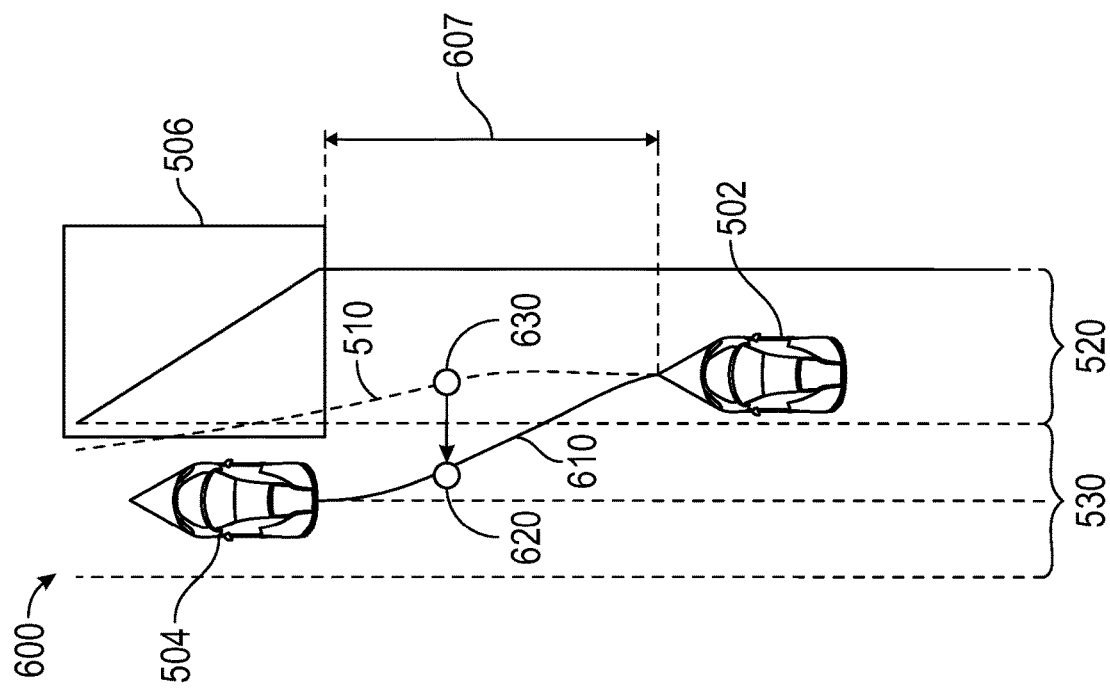
FIGS. 5-6 depict a sequence of different states for an exemplary scenario for an example implementation of the deadline-based lateral maneuvering process of FIG. 3 according to one or more aspects described herein.
Figure 5:
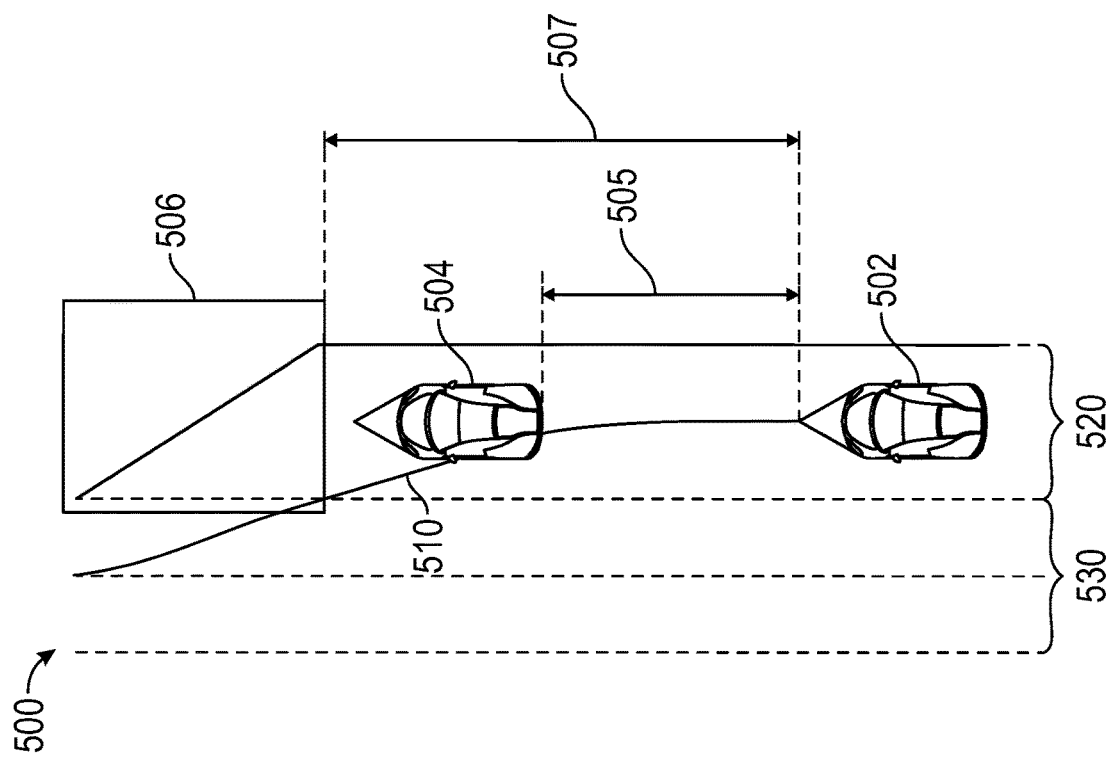

FIGS. 5-6 depict an exemplary sequence of scenarios illustrating the deadline-based lateral maneuvering process 300 of FIG. 3 at a vehicle 502, which could be an instance of vehicle 10. FIG. 5 depicts an initial state 500 of the vehicle 502 traveling along a route within a first lane 520 behind another vehicle 504 while being operated in a Level Two autonomous operating mode that attempts to maintain the vehicle 502 substantially centered within the current lane 520 of travel at a user-defined velocity, subject to other user-defined or user-configurable constraints (e.g., separation distances from other vehicles and the like). FIG. 5 depicts an avoidance zone 506 corresponding to a region where an obstacle or other hazard has been detected within the current lane 520 of travel, such as, for example, a traffic barrier for road construction causing the lane 520 to merge into the adjacent lane 530. In response to detecting or otherwise identifying the object region in the current lane 520, the guidance system 78 of the ADS 70 at the vehicle 502 automatically initiates the deadline-based lateral maneuvering process 300 to perform a lateral maneuver to navigate around the detected object region by changing into the adjacent lane 530. That said, the deadline-based lateral maneuvering process 300 may be similarly implemented as depicted in the context of FIGS. 5-6 in response to other indicia of a potential deadline for a lateral maneuver (e.g., the driver or other user manipulating a turn signal switch to initiate a lane change).

As described above in the context of FIG. 3, the ADS 70 and/or the guidance system 78 identifies a first avoidance zone corresponding to the other vehicle 504 detected in front of the vehicle and the second avoidance zone 506 corresponding to the detected object or obstacle within the current lane 520 of travel (e.g., at 302). The ADS 70 and/or the guidance system 78 obtains information indicative of the distance 505 between the vehicles 502, 504 and the relative velocity of the other vehicle 504 relative to the ownship vehicle 502 from the sensor fusion system 74 and converts the distance 505 into a corresponding estimate of the amount of time required for the ownship vehicle 502 to reach the other vehicle 504. Similarly, the ADS 70 and/or the guidance system 78 obtains information indicative of the distance 507 between the ownship vehicle 502 and the detected object corresponding to the avoidance zone 506 from the sensor fusion system 74, and converts the distance 507 into a corresponding estimate of the amount of time required for the ownship vehicle 502 to reach the avoidance zone 506, for example, by dividing the distance 507 by the velocity of the ownship vehicle 502 when the avoidance zone 506 is stationary. As a result, the estimated amount of time required for the ownship vehicle 502 to reach the avoidance zone 506 associated with the road closure is less than the amount of time required for the ownship vehicle 502 to reach the other vehicle 504 which is traveling substantially the same speed as the ownship vehicle 502, and accordingly, the avoidance zone 506 associated with the detected object in the current lane 520 of travel is identified as the highest priority avoidance zone (e.g., at 304).

After identifying the avoidance zone 506 as the highest priority avoidance zone, the ADS 70 and/or the guidance system 78 calculates or otherwise determines a corresponding deadline for completing a lateral maneuver around the avoidance zone (e.g., at 306) and then utilizes the maneuver deadline to obtain lateral planning information corresponding to an initial reference lateral trajectory 510 for a lateral maneuver into the adjacent lane 530 to navigate the vehicle 502 around the avoidance zone 506 by changing lanes from the current lane 520 to the adjacent lane 530 before the deadline point in time (e.g., at 310) when the vehicle 502 is expected to reach the avoidance zone 506 if operation in the current lane 520 is maintained. The initial lateral planning information for the reference lateral trajectory 510 is input or otherwise provided to the vehicle control system 80, which, in turn, autonomously operates the vehicle 502 to perform the lateral maneuver corresponding to the reference lateral trajectory 510 as described above.

FIG. 6 depicts an updated state 600 of the vehicle 502 during execution of the reference lateral trajectory 510, where the other vehicle 504 has changed lanes to navigate around the road closure which resulted in the vehicle control system 80 increasing the velocity (or reducing deceleration) of the ownship vehicle 502 when the other vehicle 504 was no longer in front of the ownship vehicle 502. In this regard, FIG. 6 depicts a scenario where the deadline-based lateral maneuvering process 300 identifies an updated lateral maneuver deadline that is earlier in time (e.g., at 308) based on the reduced distance 607 between the ownship vehicle 502 and the avoidance zone 506. As a result, the ADS 70 and/or the guidance system 78 utilizes the updated maneuver deadline to obtain updated lateral trajectory information including an updated look-ahead control point 620 (and corresponding vehicle heading and path curvatures associated therewith) resulting in a corresponding updated reference lateral trajectory 610 (e.g., at 310) for aligning the vehicle 502 with the centerline of the adjacent lane 530. The updated reference lateral trajectory 610 is more aggressive than the prior lateral trajectory 510 to ensure the vehicle 502 is navigated around the avoidance zone 506 by performing a lateral maneuver to change lanes from the current lane 520 to the adjacent lane 530 more quickly than the current reference lateral trajectory 510, which would otherwise be dictated by the previously determined look-ahead control point 630 and associated vehicle heading and path curvature. The updated reference lateral trajectory information is then input or otherwise provided to the vehicle control system 80 in lieu of the previous reference lateral trajectory information, which, in turn, results in the vehicle control system 80 autonomously operating the vehicle 502 more aggressively along the updated reference lateral trajectory 610 in lieu of lateral trajectory 510 to complete the lateral maneuver from the initial lane 520 to the adjacent lane 530 and ensure the lateral maneuver is completed before the updated lateral maneuver deadline, thereby ensuring the vehicle 502 avoids the avoidance zone 506. In this manner, by iteratively adjusting the lateral reference trajectory utilizing a lookup table of predefined lateral trajectory planning information to account for real-world performance of the vehicle control system 80, the deadline-based lateral maneuvering process 300 ensures a lateral maneuver is completed by a particular deadline dictated by dynamic and unpredictable road conditions without being constrained by rideability constraints and without introducing delays in a manner that is computationally feasible.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of controlling a vehicle in an autonomous operating mode, the method comprising:
   identifying, by a controller associated with the vehicle, one or more avoidance zones in a vicinity of the vehicle;
   determining, by the controller, a deadline for completing a lateral maneuver to avoid a priority avoidance zone of the one or more avoidance zones based at least in part on an estimated amount of travel time between a current pose of the vehicle and the priority avoidance zone based on a distance between the vehicle and the priority avoidance zone and a velocity of the vehicle;
   obtaining, by the controller, an initial reference lateral trajectory for the lateral maneuver from a lookup table maintained in a data storage associated with the vehicle using the deadline and the velocity of the vehicle;
   autonomously operating, by the controller, one or more actuators onboard the vehicle in accordance with the initial reference lateral trajectory; and
   thereafter obtaining, by the controller, one or more updated reference lateral trajectories for the vehicle from the lookup table based on an amount of progress with respect to the lateral maneuver over time, wherein the controller autonomously operates the one or more actuators onboard the vehicle in accordance with the one or more updated reference lateral trajectories in lieu of the initial reference lateral trajectory.

2. The method of claim 1, further comprising determining, by the controller, an updated deadline for completing the lateral maneuver after autonomously operating the one or more actuators onboard the vehicle in accordance with the initial reference lateral trajectory, wherein:
   obtaining the one or more updated reference lateral trajectories comprises obtaining updated reference lateral trajectory information from the lookup table using the updated deadline; and
   the controller autonomously operates the one or more actuators onboard the vehicle in accordance with an updated reference lateral trajectory corresponding to the updated reference lateral trajectory information in lieu of the initial reference lateral trajectory.

3. The method of claim 1, further comprising identifying, by the controller, a deviation between the current pose of the vehicle and the initial reference lateral trajectory that is greater than a trajectory updating threshold, wherein:
   obtaining the one or more updated reference lateral trajectories comprises obtaining updated reference lateral trajectory information from the lookup table when the deviation is greater than the trajectory updating threshold; and
   the controller autonomously operates the one or more actuators onboard the vehicle in accordance with an updated reference lateral trajectory corresponding to the updated reference lateral trajectory information in lieu of the initial reference lateral trajectory.

4. The method of claim 1, further comprising determining, by the controller, an updated deadline for completing the lateral maneuver after autonomously operating the one or more actuators onboard the vehicle in accordance with the initial reference lateral trajectory, wherein:
   obtaining the one or more updated reference lateral trajectories comprises obtaining an updated reference lateral trajectory using the updated deadline; and
   the controller autonomously operates the one or more actuators onboard the vehicle in accordance with the updated reference lateral trajectory in lieu of the initial reference lateral trajectory.

5. The method of claim 1, wherein autonomously operating the one or more actuators onboard the vehicle in accordance with the initial reference lateral trajectory comprises a guidance system inputting the initial reference lateral trajectory as input route information to a vehicle control system configured to generate control signals for the one or more actuators onboard the vehicle according to the input route information.

6. The method of claim 1, further comprising identifying, by the controller, the priority avoidance zone of the one or more avoidance zones as a respective avoidance zone of the one or more avoidance zones that the vehicle is expected to reach earliest in time relative to other avoidance zones of the one or more avoidance zones.

7. The method of claim 1, wherein determining the deadline for completing the lateral maneuver comprises calculating the estimated amount of travel time between the current pose of the vehicle and the priority avoidance zone based on the distance between the vehicle and the priority avoidance zone and the velocity of the vehicle relative to a second velocity associated with the priority avoidance zone.

8. The method of claim 1, wherein obtaining the one or more updated reference lateral trajectories for the vehicle from the lookup table based on the amount of progress with respect to the lateral maneuver over time comprises iteratively adjusting the initial reference lateral trajectory utilizing the lookup table of predefined lateral trajectory planning information to ensure the lateral maneuver is completed by the deadline.

9. The method of claim 8, wherein iteratively adjusting the initial reference lateral trajectory comprises iteratively adjusting the initial reference lateral trajectory to be more aggressive when the amount of progress indicates the lateral maneuver may be unable to be completed within the deadline.

10. The method of claim 8, wherein iteratively adjusting the initial reference lateral trajectory comprises iteratively adjusting the initial reference lateral trajectory to improve passenger comfort when the amount of progress indicates the lateral maneuver is likely to be completed in advance of the deadline.

11. A vehicle comprising:
   a data storage to maintain a lookup table of lateral planning information;
   one or more sensing devices onboard the vehicle;
   one or more actuators onboard the vehicle; and
   a controller that, by a processor, identifies one or more avoidance zones in a vicinity of the vehicle based at least in part on sensor data from the one or more sensing devices onboard the vehicle, determines a deadline for completing a lateral maneuver to avoid a priority avoidance zone of the one or more avoidance zones based at least in part on an estimated amount of travel time between a current pose of the vehicle and the priority avoidance zone based on a distance between the vehicle and the priority avoidance zone and a velocity of the vehicle, obtains first lateral planning information for the lateral maneuver from the lookup table using the deadline and the velocity of the vehicle, autonomously operates the one or more actuators onboard the vehicle in accordance with an initial reference lateral trajectory corresponding to the first lateral planning information, and thereafter obtains updated lateral planning information for the vehicle from the lookup table based on an amount of progress with respect to the lateral maneuver over time and autonomously operates the one or more actuators onboard the vehicle in accordance with an updated reference lateral trajectory corresponding to the updated lateral planning information in lieu of the initial reference lateral trajectory.

12. The vehicle of claim 11, wherein the controller determines an updated deadline for completing the lateral maneuver after autonomously operating the one or more actuators onboard the vehicle in accordance with the initial reference lateral trajectory, obtains the updated lateral planning information from the lookup table using the updated deadline.

13. The vehicle of claim 11, wherein the controller identifies a deviation between the current pose of the vehicle and the initial reference lateral trajectory that is greater than a trajectory updating threshold and obtains the updated lateral planning information from the lookup table when the deviation is greater than the trajectory updating threshold.

14. The vehicle of claim 11, wherein the controller comprises a guidance system that inputs the first lateral planning information as input route information to a vehicle control system configured to generate control signals for the one or more actuators onboard the vehicle to achieve the initial reference lateral trajectory according to the input route information.

15. The vehicle of claim 11, wherein the controller identifies the priority avoidance zone of the one or more avoidance zones as a respective avoidance zone of the one or more avoidance zones that the vehicle is expected to reach earliest in time relative to other avoidance zones of the one or more avoidance zones.

16. The vehicle of claim 11, wherein the controller determines the deadline for completing the lateral maneuver by calculating the estimated amount of travel time between the current pose of the vehicle and the priority avoidance zone based on the distance between the vehicle and the priority avoidance zone and the velocity of the vehicle relative to a second velocity associated with the priority avoidance zone.

17. A non-transitory computer-readable medium comprising executable instructions that, when executed by a processor, cause the processor to:

identify one or more avoidance zones in a vicinity of a vehicle;

determine a deadline for completing a lateral maneuver to avoid a priority avoidance zone of the one or more avoidance zones based at least in part on an estimated amount of travel time between a current pose of the vehicle and the priority avoidance zone based on a distance between the vehicle and the priority avoidance zone and a velocity of the vehicle;

obtain an initial reference lateral trajectory for the lateral maneuver from a lookup table maintained in a data storage associated with the vehicle using the deadline and the velocity of the vehicle;

autonomously operate one or more actuators onboard the vehicle in accordance with the initial reference lateral trajectory; and thereafter:

obtain one or more updated reference lateral trajectories for the vehicle from the lookup table based on an amount of progress with respect to the lateral maneuver over time; and autonomously operate the one or more actuators onboard the vehicle in accordance with the one or more updated reference lateral trajectories in lieu of the initial reference lateral trajectory.

18. The non-transitory computer-readable medium of claim 17, wherein the executable instructions cause the processor to determine an updated deadline for completing the lateral maneuver after autonomously operating the one or more actuators onboard the vehicle in accordance with the initial reference lateral trajectory, wherein:

obtaining the one or more updated reference lateral trajectories comprises obtaining an updated reference lateral trajectory using the updated deadline; and the processor autonomously operates the one or more actuators onboard the vehicle in accordance with the updated reference lateral trajectory in lieu of the initial reference lateral trajectory.

19. The non-transitory computer-readable medium of claim 17, wherein the executable instructions cause the processor to identify the priority avoidance zone of the one or more avoidance zones as a respective avoidance zone of the one or more avoidance zones that the vehicle is expected to reach earliest in time relative to other avoidance zones of the one or more avoidance zones.

20. The non-transitory computer-readable medium of claim 17, wherein the executable instructions cause the processor to determine the deadline for completing the lateral maneuver by calculating the estimated amount of travel time between the current pose of the vehicle and the priority avoidance zone based on the distance between the vehicle and the priority avoidance zone and the velocity of the vehicle relative to a second velocity associated with the priority avoidance zone.

\* \* \* \* \*